United States Patent [19]

Perkins

[11] Patent Number: 5,789,706
[45] Date of Patent: Aug. 4, 1998

[54] ELECTRICAL CABLE TO UTILIZATION DEVICE QUICK CONNECTOR

[76] Inventor: Vernon Perkins, P.O. Box 20644, New York, N.Y. 10009

[21] Appl. No.: 785,657

[22] Filed: Jan. 17, 1997

[51] Int. Cl.[6] .................................................. H02G 3/18
[52] U.S. Cl. .......................... 174/65 R; 174/135; 285/162
[58] Field of Search ............................ 174/65 R, 65 G, 174/151, 152 G, 153 G, 152 R, 153 R, 135; 16/2.1, 2.2; 248/56; 285/162, 194

[56] References Cited

U.S. PATENT DOCUMENTS

| | | | |
|---|---|---|---|
| 2,490,253 | 12/1949 | Buchanan | 174/65 R |
| 3,567,843 | 3/1971 | Collins | 174/51 |
| 3,603,912 | 9/1971 | Kelly | 339/89 C |
| 3,958,300 | 5/1976 | Tanaka | 16/2.1 X |
| 4,155,619 | 5/1979 | Bray et al. | 339/177 R |
| 4,324,503 | 4/1982 | Sevrence | 16/2.1 X |
| 4,549,755 | 10/1985 | Kot et al. | 285/341 |
| 4,655,422 | 4/1987 | Kelsall | 248/56 |
| 4,831,213 | 5/1989 | Espevik et al. | 174/65 R |
| 4,959,506 | 9/1990 | Petty et al. | 174/65 R |
| 5,228,875 | 7/1993 | Swenson, Sr. | 439/784 |

FOREIGN PATENT DOCUMENTS

| | | | |
|---|---|---|---|
| 566248 | 7/1960 | Belgium | 174/65 R X |
| 598715 | 5/1960 | Canada | 174/65 R X |

*Primary Examiner*—Hyung S. Sough
*Assistant Examiner*—Dean A. Reichard
*Attorney, Agent, or Firm*—Richard L. Miller, P.E.

[57] ABSTRACT

An electrical cable to utilization device quick connector that quickly and securely connects an electrical cable to a utilization device from the exterior of the utilization device without having to access the interior of the utilization device to turn a locking nut. The electrical cable to utilization device quick connector includes a hollow body, electrical cable securing apparatus that is associated with the hollow body and selectively maintains the electrical cable in the electrical cable to utilization device quick connector, a first flat, thin, and oval-shaped eccentric ring that is integrally formed with the hollow body, a flat, thin, and circular-shaped intermediate ring that is integrally formed with the first flat, thin, and oval-shaped eccentric ring, a second flat, thin, and oval-shaped eccentric ring that is integrally formed with the flat, thin, and circular-shaped intermediate ring, an internally-threaded sleeve disposed on the hollow body, and a connector securing screw threadably engaging the internally-threaded sleeve.

23 Claims, 2 Drawing Sheets

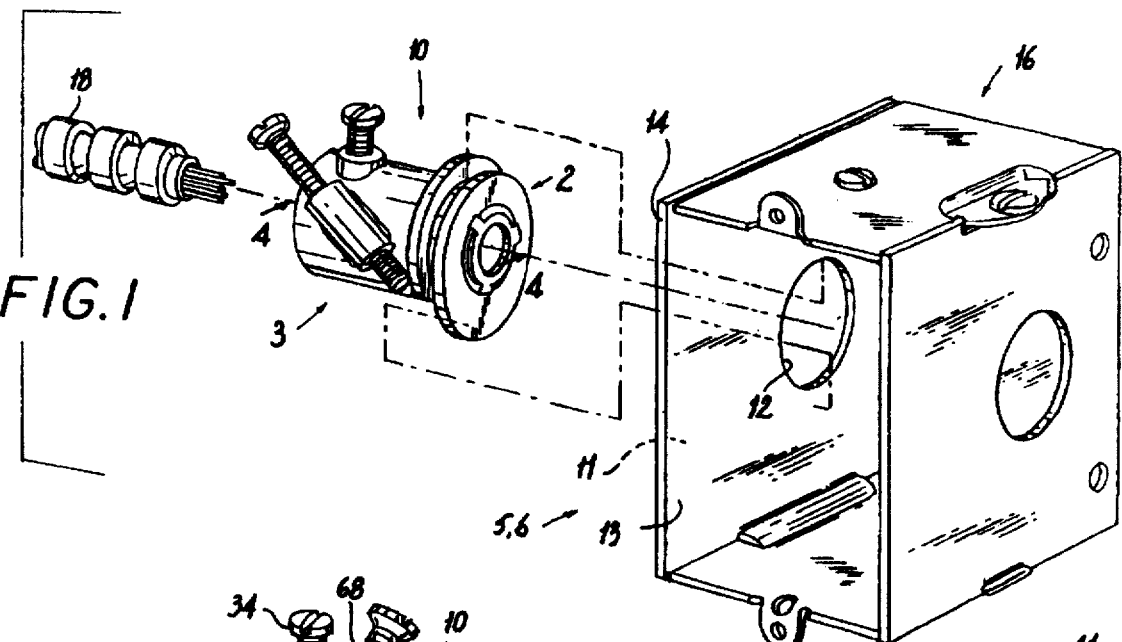
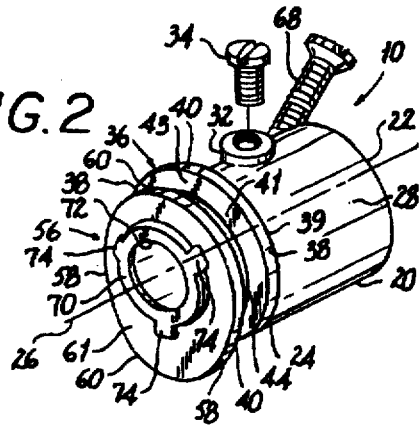
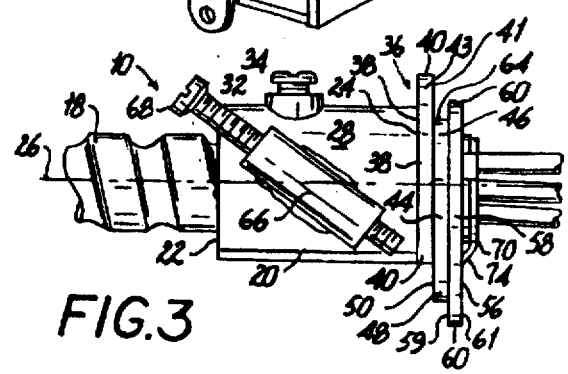
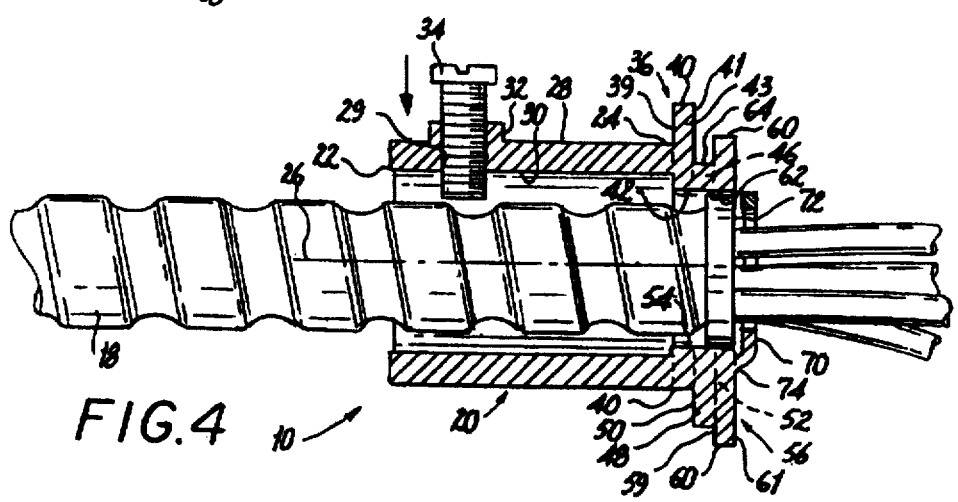

ELECTRICAL CABLE TO UTILIZATION DEVICE QUICK CONNECTOR

BACKGROUND OF THE INVENTION

The present invention relates to an electrical cable to utilization device quick connector. More particularly, the present invention relates to an electrical cable to utilization device quick connector that quickly and securely connects an electrical cable to a utilization device from the exterior of the utilization device without having to access the interior of the utilization device to turn a locking nut. The electrical cable to-utilization device quick connector includes a hollow body, electrical cable securing apparatus that is associated with the hollow body and selectively maintains the electrical cable in the electrical cable to utilization device quick connector, a first flat, thin, and oval-shaped eccentric ring that is integrally formed with the hollow body, a flat, thin, and circular-shaped intermediate ring that is integrally formed with the first flat, thin, and oval-shaped eccentric ring, a second flat, thin, and oval-shaped eccentric ring that is integrally formed with the flat, thin, and circular-shaped intermediate ring, an internally-threaded sleeve disposed on the hollow body, and a connector securing screw threadably engaging the internally-threaded sleeve.

It is often necessary to effect a coupling between a metal clad (MC) armored cable such as a jacketed type MC cable with interlocking smooth or corrugated sheathing, jacketed type alternating current (AC) armored cable, or the like and a utilization device such as a junction box or other devices.

A general requirement for such a coupling is that it be waterproof, reliable, able to withstand various stresses, the proper grounding of the armor be effected, and that the coupling procedure be simple and convenient.

Connectors for attaching non-armored jacketed power cable to junction boxes are well known in the art. Generically these usually consist of a resilient grommet which is compressed between two threaded members of connectors to form a watertight gland for sealing the cable to the connectors.

Also, well known in the art are connectors for connecting non-jacketed armored cables to a junction box, wherein the armored cable is gripped by set screws in the connector. Prior workers in the field have combined the features of the latter type of connector with a resilient grommet to provide a connector for jacketed armored cable wherein the grommeted gland seals against the jacket and the set screws bear on an exposed portion of the armor to provide electrical grounding. To prevent deformation of the armor a metal sleeve or pressure pads are frequently interposed between the armor and in the set screws.

In other known connectors for the same purpose, resilient grommets of rubber-like material and deformable lead grommets with suitable compression fittings are employed to secure the watertight seal and electrical continuity.

Finally, in another known construction a grounding sleeve is forced between the insulating jacket and the armor of the cable and a depending tab is bent back upon the jacket to provide a ground connection with the metal surface of the connector when it is assembled on the cable with the compressible waterproof bushing.

All of the aforementioned types of connectors for attaching electrical cables to junction boxes require access to the interior surface of the wall of the junction boxes to facilitate the attachment, a requirement that does not bode well in tight space constraints.

Numerous innovations for electrical cable connectors have been provided in the prior art that will be described. Even though these innovations may be suitable for the specific individual purposes to which they address, however, they differ from the present invention in that they do not teach an electrical cable to utilization device quick connector that quickly and securely connects an electrical cable to a utilization device from the exterior of the utilization device without having to access the interior of the utilization device to turn a locking nut. The electrical cable to utilization device quick connector includes a hollow body, electrical cable securing apparatus that is associated with the hollow body and selectively maintains the electrical cable in the electrical cable to utilization device quick connector, a first flat, thin, and oval-shaped eccentric ring that is integrally formed with the hollow body, a flat, thin, and circular-shaped intermediate ring that is integrally formed with the first flat, thin, and oval-shaped eccentric ring, a second flat, thin, and oval-shaped eccentric ring that is integrally formed with the flat, thin, and circular-shaped intermediate ring, an internally-threaded sleeve disposed on the hollow body, and a connector securing screw threadably engaging the internally-threaded sleeve.

FOR EXAMPLE, U.S. Pat. No. 3,567,843 to Collins teaches an electrical connector for attaching an armored cable having an exterior waterproof jacket to a junction box, such that the cable is rigidly mechanically gripped by the connector, is electrically grounded thereto, and is sealed therein in a watertight seal. The connector consists of a resilient grommet surrounding the cable jacket and compressed between two threaded members to provide a watertight seal and mechanical gripping. A plurality of metallic stirrups straddle the inner and outer surfaces of the grommet at one end thereof to coact both with an exposed portion of the metallic armor of the cable and the metal of the connector to provide electrical grounding and additional mechanical gripping of the cable. The connector is further provided with an additional threaded portion for attachment to the junction box.

ANOTHER EXAMPLE, U.S. Pat. No. 3,603,912 to Kelly teaches a raceway terminator for coupling a jacketed flexible metallic raceway to an electrical enclosure. The terminator comprises a body portion, a gland nut for assembly therewith, a grounding cone, and a sealing ring. The sealing ring has tapered leading and trailing edges and an annular shoulder thereabout which cooperate with an annular rib on the gland nut to provide for the holding of the jacketed flexible metallic raceway as well as providing a moisture seal therebetween and preventing abrasion of the jacket of the raceway by the terminator.

STILL ANOTHER EXAMPLE, U.S. Pat. No. 4,155,619 to Bray et al. teaches an electric contact connector for armored coaxial cables. The connector, which comprises a tubular plug-in member in which there is fastened a bushing for holding a contact cable and a clamping element clamped on said bushing around the armoring of said cable, has the feature that it comprises a single-piece tubular body having, without interruption of continuity, two separate zones one of which constitutes the plug-in element and the other the clamping element. One thus obtains simultaneously the clamping of the armoring and the holding of the cable holding sleeve solely by the clamping operation of the clamping zone of the tubular body.

STILL ANOTHER EXAMPLE, U.S. Pat. No. 4,549,755 to Kot et al. teaches a watertight connector for jacketed metal clad armored cable. The connector includes a cylindrical body member externally threaded at opposite ends and has an enlarged rear bore delineated from the front bore by an annular shoulder. The rear bore has a rearwardly facing conical face intermediate its front and rear ends. An elastomeric bushing has a front portion telescoping the conical face. A flat metal washer engages the bushing rear face and is superimposed by a relatively hard deformable plastic ring. A gland nut engages the body member rear threaded portion and has a conical forwardly facing shoulder bearing on the plastic ring. A grounding collar is located in the forward end of the enlarged bore and engages the annular shoulder and includes forwardly inwardly inclined resilient fingers.

FINALLY, YET ANOTHER EXAMPLE, U.S. Pat. No. 5,228,875 to Swenson, Sr. teaches a positive quick connect electrical connector for connecting the bare ends of a pair of electrical wires. The connector is constituted by a molded non-conductive female coupling member having a connection chamber therein and threaded walls. A metal connector member is secured to an end of one of the pair of electrical wires. The metal connector member is positioned in the connection chamber and has a conically-shaped end surface to provide a wire guiding and engaging surface for the bare end of the other of the pair of electrical wires. A non-conductive male coupling member has a bore therethrough. A first end of the bore has a conically-shaped annular wall which is complementary to the conically-shaped end surface on the metal connector member. The conically-shaped surfaces are spaced a variable distance S apart. A threaded external surface on the male coupling member is in threaded engagement with the threaded internal bore in the female coupling member, whereby a bare end of the other of the pair of wires introduced into the bore of male coupling member is guided off axis by the conically-shaped end surface of the metal connector to a position between said spaced conical surfaces, and rotation of one of said members relative to the other engages threads to reduce the distance to clamp the bare end of the other of the pair of wires between the conical surfaces.

It is apparent that numerous innovations for electrical cable connectors have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an electrical cable to utilization device quick connector that avoids the disadvantages of the prior art.

ANOTHER OBJECT of the present invention is to provide an electrical cable to utilization device quick connector that is simple and inexpensive to manufacture.

STILL ANOTHER OBJECT of the present invention is to provide an electrical cable to utilization device quick connector that is simple to use.

YET ANOTHER OBJECT of the present invention is to provide an electrical cable to utilization device quick connector that connects an electrical cable to boxes, panels, cabinets, etc.

STILL YET ANOTHER OBJECT of the present invention is to provide an electrical cable to utilization device quick connector that can be used in any application whether one would normally use a conventional ROMEX(TM) BX(TM) (armored cable), GREENFIELD(TM), EMT(TM) (electrical metallic tubing), seal tight, pipe, CHASE(TM) nipple, CHASE(TM) bushing, etc., connector.

YET STILL ANOTHER OBJECT of the present invention is to provide an electrical cable to utilization device quick connector that connects electrical cables to boxes, panels, cabinets, etc., without the use of lock nuts.

STILL YET ANOTHER OBJECT of the present invention is to provide an electrical cable to utilization device quick connector that utilizes a groove, an undercut, and a set screw to replace the lock nut so as to allow the connector to be installed faster and without having to put one's hand in the box or device to which one wishes to connect it to.

YET STILL ANOTHER OBJECT of the present invention is to provide an electrical cable to utilization device quick connector that is not only faster to work with, but is more secure and fits tighter than connectors using lock nuts.

STILL YET ANOTHER OBJECT of the present invention is to provide an electrical cable to utilization device quick connector that is easier to install and remove than those using lock nuts.

YET STILL ANOTHER OBJECT of the present invention is to provide an electrical cable to utilization device quick connector that quickly and securely connects an electrical cable with a diameter to a utilization device that has an interior, an exterior, and a wall with an exterior surface, an interior surface, and a throughbore extending therethrough, wherein the electrical cable to utilization device quick connector quickly and securely connects the electrical cable to the utilization device from the exterior of the utilization device without having to access the interior of the utilization device to turn a locking nut.

BRIEFLY STATED, STILL YET ANOTHER OBJECT of the present invention is to provide an electrical cable to utilization device quick connector that includes a hollow body, electrical cable securing apparatus, a first flat, thin, and oval-shaped eccentric ring, a flat, thin, and circular-shaped intermediate ring, a second flat, thin, and oval-shaped eccentric ring, an internally-threaded sleeve, and a connector securing screw.

YET STILL ANOTHER OBJECT of the present invention is to provide an electrical cable to utilization device quick connector wherein the hollow body has an open proximal end, a distal end spaced from the open proximal end of the hollow body, a longitudinal axis, and an outer surface, and contains an internal throughchamber that has a diameter and opens into both the open proximal end of the hollow body and the distal end of the hollow body.

STILL YET ANOTHER OBJECT of the present invention is to provide an electrical cable to utilization device quick connector wherein the electrical cable securing apparatus is associated with the hollow body and selectively maintains the electrical cable in the hollow body, so that the electrical cable is selectively maintained in the electrical cable to utilization device quick connector.

YET STILL ANOTHER OBJECT of the present invention is to provide an electrical cable to utilization device quick connector wherein the first flat, thin, and oval-shaped eccentric ring has a proximal surface integrally formed with the distal end of the hollow body, a pair of opposing minor arc sides with a lowermost minor arc side thereof being flush with the outer longitudinal surface of the hollow body and with an opposing uppermost minor arc side thereof extending perpendicularly upwardly past the outer longitudinal surface of the hollow body, towards the electrical cable securing apparatus, and forming a stop, a pair of opposing major arc sides that extend perpendicularly outwardly past the outer longitudinal surface of the hollow body, intermediate the pair of minor arc sides of the first flat, thin, and oval-shaped eccentric ring, a distal surface parallel to, and spaced from, the proximal surface of the first flat, thin, and oval-shaped eccentric ring, and a circular-shaped throughbore with a diameter.

STILL YET ANOTHER OBJECT of the present invention is to provide an electrical cable to utilization device quick connector wherein the flat, thin, and circular-shaped intermediate ring has a proximal surface integrally formed with the distal surface of the first flat, thin, and oval-shaped eccentric ring, an upper portion disposed below the stop of the first flat, thin, and oval-shaped eccentric ring, a lower portion extending perpendicularly downwardly past the lowermost minor arc side of the pair of minor arc sides of the first flat, thin, and oval-shaped eccentric ring, in a direction opposite to the electrical cable securing apparatus, a distal surface parallel to, and spaced from, the proximal surface of the flat, thin, and circular-shaped intermediate ring, and a circular-shaped and centrally-disposed throughbore with a diameter.

YET STILL ANOTHER OBJECT of the present invention is to provide an electrical cable to utilization device quick connector wherein the second flat, thin, and oval-shaped eccentric ring has a proximal surface integrally formed with the distal surface of the flat, thin, and circular-shaped intermediate ring, a pair of opposing minor arc sides with a lowermost minor arc side thereof extending perpendicularly downwardly past the lower portion of the flat, thin, and circular-shaped intermediate ring, in the direction opposite to the electrical cable securing means and with an opposing uppermost minor arc side thereof extending perpendicularly upwardly past the upper portion of the flat, thin, and circular-shaped intermediate ring, towards the electrical cable securing means extends, and together with the stop of the first flat, thin, and oval-shaped eccentric ring and the upper portion of the flat, thin, and circular-shaped intermediate ring define a back cut, a pair of opposing major arc sides extending perpendicularly outwardly past the flat, thin, and circular-shaped intermediate ring, a distal surface parallel to, and spaced from, the proximal surface of the second flat, thin, and oval-shaped eccentric ring, and a circular-shaped throughbore with a diameter. The internally-threaded sleeve is disposed on the outer surface of the hollow body, diagonally to the longitudinal axis of the hollow body, and extends diagonally downwardly from short of the open proximal end of the hollow body to short of the distal end of the hollow body, in a direction towards the lower portion of the flat, thin, and circular-shaped intermediate ring.

STILL YET ANOTHER OBJECT of the present invention is to provide an electrical cable to utilization device quick connector wherein the connector securing screw threadably engages the internally-threaded sleeve and is snugly abutable against the exterior of the wall of the utilization device so as to selectively maintain the electrical cable to utilization device quick connector to the utilization device, so that when the electrical cable to utilization device quick connector is tilted upwardly and the lowermost minor arc side of the pair of minor arc sides of the second flat, thin, and oval-shaped eccentric ring and the lower portion of the flat, thin, and circular-shaped intermediate ring are passed through the throughbore in the wall of the utilization device that is defined by a perimeter and then when the electrical cable to utilization device quick connector is tilted downwardly and the perimeter of the throughbore in the wall of the utilization device is seated in the back cut and against the flat, thin, and circular-shaped intermediate ring and the distal surface of the first flat, thin, and oval-shaped eccentric ring abuts against the outer surface of the wall of the utilization device and the proximal surface of the second flat, thin, and oval-shaped eccentric ring abuts against the inner surface of the wall of the utilization device and then when the connector securing screw is rotated and caused to thread along the internally-threaded sleeve and abut against the outer surface of the wall of the utilization device so as to maintain the wall of the utilization device in the back cut and between the first flat, thin, and oval-shaped eccentric ring and the second flat, thin, and oval-shaped eccentric ring and between the connector securing screw and the second flat, thin, and oval-shaped eccentric ring, the electrical cable to utilization device quick connector with the electrical cable maintained therein is quickly and securely connected to the utilization device from the exterior of the utilization device without having to access the interior of the utilization device to turn a lock nut.

YET STILL ANOTHER OBJECT of the present invention is to provide an electrical cable to utilization device quick connector wherein the hollow body is one of a hollow and cylindrically-shaped body and a hollow and L-shaped body that has a long leg with the open proximal end thereat and the longitudinal axis therealong and a short leg with the distal end thereat.

STILL YET ANOTHER OBJECT of the present invention is to provide an electrical cable to utilization device quick connector wherein the diameter of the circular-shaped throughbore in the first flat, thin, and oval-shaped eccentric ring is less than the diameter of the internal throughchamber in the hollow body.

YET STILL ANOTHER OBJECT of the present invention is to provide an electrical cable to utilization device quick connector wherein the circular-shaped throughbore in the first flat, thin, and oval-shaped eccentric ring is coaxial and communicates with the internal throughchamber in the hollow body.

STILL YET ANOTHER OBJECT of the present invention is to provide an electrical cable to utilization device quick connector wherein the diameter of the circular-shaped and centrally-disposed throughbore in the flat, thin, and circular-shaped intermediate ring is equal to the diameter of the circular-shaped throughbore in the first flat, thin, and oval-shaped eccentric ring.

YET STILL ANOTHER OBJECT of the present invention is to provide an electrical cable to utilization device quick connector wherein the circular-shaped and centrally-disposed throughbore in the flat, thin, and circular-shaped intermediate ring is coaxial and communicates with the circular-shaped throughbore in the first flat, thin, and oval-shaped eccentric ring.

STILL YET ANOTHER OBJECT of the present invention is to provide an electrical cable to utilization device quick connector wherein the diameter of the circular-shaped throughbore in the second flat, thin, and oval-shaped eccentric ring is equal to the diameter of the circular-shaped and centrally-disposed throughbore in the flat, thin, and circular-shaped intermediate ring.

YET STILL ANOTHER OBJECT of the present invention is to provide an electrical cable to utilization device quick connector wherein the circular-shaped throughbore in the second flat, thin, and oval-shaped eccentric ring is coaxial and communicates with the circular-shaped and centrally-disposed throughbore in the flat, thin, and circular-shaped intermediate ring.

STILL YET ANOTHER OBJECT of the present invention is to provide an electrical cable to utilization device quick connector that further includes a removably-mounted and circular-ring-shaped electrical cable stop that has a circular-shaped and centrally-disposed throughbore with a diameter less than the diameter of the circular-shaped throughbore in the second flat, thin, and oval-shaped eccentric ring and provides a stop for the electrical cable when the diameter of the electrical cable is less than the diameter of the circular-shaped throughbore in the second flat, thin, and oval-shaped eccentric ring so as to allow the electrical cable to utilization device quick connector to be used with different sized raceways.

YET STILL ANOTHER OBJECT of the present invention is to provide an electrical cable to utilization device quick connector wherein the removably-mounted and circular-ring-shaped electrical cable stop is parallel to, and spaced slightly outward from, the distal surface of the second flat, thin, and oval-shaped eccentric ring, and is removably attached thereto, by a plurality of equally-spaced apart and circumferentially-radially-disposed breakable tabs.

STILL YET ANOTHER OBJECT of the present invention is to provide an electrical cable to utilization device quick connector wherein the electrical cable securing means includes the hollow body having a radially-oriented and threaded throughbore with a perimeter and which extends radially therethrough, perpendicularly to the longitudinal axis of the hollow body, and in proximity to the open proximal end of the hollow body.

YET STILL ANOTHER OBJECT of the present invention is to provide an electrical cable to utilization device quick connector wherein the electrical cable securing means further includes an internally-threaded and cylindrically-shaped collar that extends coaxially, and slightly outwardly, from the perimeter of the radially oriented and threaded throughbore in the hollow body and threadably communicates with the radially-oriented and threaded throughbore in the hollow body.

STILL YET ANOTHER OBJECT of the present invention is to provide an electrical cable to utilization device quick connector wherein the electrical cable securing means further includes an electrical cable securing screw that threadably engages both the internally-threaded and cylindrically-shaped collar and the radially-oriented and threaded throughbore in the hollow body and is snugly abutable against the electrical cable so as to selectively maintain a metal clad armored electrical cable in the hollow body, so that the metal clad armored electrical cable is selectively maintained in the electrical cable to utilization device quick connector.

YET STILL ANOTHER OBJECT of the present invention is to provide an electrical cable to utilization device quick connector wherein the hollow body is a two part hollow body.

STILL YET ANOTHER OBJECT of the present invention is to provide an electrical cable to utilization device quick connector wherein the two part hollow body includes a main portion that is one of cylindrically-shaped and L-shaped.

YET STILL ANOTHER OBJECT of the present invention is to provide an electrical cable to utilization device quick connector wherein the main portion of the two part hollow body has at least a substantially U-shape in profile portion with an open top defined by a pair of parallel, spaced-apart, and straight edges.

STILL YET ANOTHER OBJECT of the present invention is to provide an electrical cable to utilization device quick connector wherein the open top of the substantially U-shape in profile portion of the L-shaped main portion of the two part hollow body is along the long leg thereof.

YET STILL ANOTHER OBJECT of the present invention is to provide an electrical cable to utilization device quick connector wherein the electrical cable securing means includes a pair of laterally-oriented, spaced-apart, and coplanar tabs, each of which extends laterally outwardly from a respective edge of the pair of parallel, spaced-apart, and straight edges of the open top of the substantially U-shape in profile portion of the main portion of the two part hollow body, and has a threaded throughbore extending therethrough.

STILL YET ANOTHER OBJECT of the present invention is to provide an electrical cable to utilization device quick connector wherein the two part hollow body further includes an elongated and convexo-concave-shaped cover portion that selectively opens and closes the open top of the substantially U-shape in profile portion of the main portion of the two part hollow body, and has a pair of parallel, spaced-apart, and straight edges.

YET STILL ANOTHER OBJECT of the present invention is to provide an electrical cable to utilization device quick connector wherein the electrical cable securing means further includes a pair of laterally-oriented, spaced-apart, and coplanar tabs, each of which extends laterally outwardly from a respective edge of the pair of parallel, spaced-apart, and straight edges of the elongated and convexo-concave-shaped cover portion of the two part body and has a threaded throughbore extending therethrough that is in alignment with the threaded throughbore in a respective tab of the pair of laterally-oriented, spaced-apart, and coplanar tabs of the electrical cable securing means on the substantially U-shape in profile portion of the main portion of the two part hollow body.

YET STILL ANOTHER OBJECT of the present invention is to provide an electrical cable to utilization device quick connector wherein the electrical cable securing means further includes a pair of retaining screws, each of which threadably engages the threaded throughbore in a tab of the pair of laterally-oriented, spaced-apart, and coplanar tabs of the electrical cable securing means on the elongated and convexo-concave-shaped cover portion of the two part hollow body and threadably engages the threaded throughbore in a respective tab of the pair of laterally-oriented, spaced-apart, and coplanar tabs of the electrical cable securing means on the substantially U-shape in profile portion of the main portion of the two part hollow body so as to selectively maintain the elongated and convexo-concave-shaped cover portion of the two part hollow body to the substantially U-shape in profile portion of the main portion of the two part hollow body, so that a non-armored electrical cable is selectively maintained in the electrical cable to utilization device quick connector.

YET STILL ANOTHER OBJECT of the present invention is to provide a method of using an electrical cable to utilization device quick connector to quickly and securely connect an electrical cable to a utilization device that has an exterior, an interior, and a wall with an exterior surface, an interior surface, and a throughbore extending therethrough that is defined by a perimeter, wherein the electrical cable is quickly and securely connected to the utilization device from the exterior of the utilization box without having to access the interior of the utilization box to turn a lock nut.

YET STILL ANOTHER OBJECT of the present invention is to provide a method of using an electrical cable to utilization device quick connector that includes the steps of threading the electrical cable into the electrical cable to utilization device quick connector; securing the electrical cable into the electrical cable to utilization device quick connector, by use of electrical cable securing means; tilting the electrical cable to utilization device quick connector upwardly; passing a lowermost minor arc side of a pair of minor arc sides of a first flat, thin, and oval-shaped eccentric ring of the electrical cable to utilization device quick connector and a lower portion of a flat, thin, and circular-shaped intermediate ring of the electrical cable to utilization device quick connector through the throughbore in the wall of the utilization device; tilting the electrical cable to utilization device quick connector downwardly; seating the perimeter of the throughbore in the wall of the utilization device in a back cut of the electrical cable to utilization device quick connector and against the flat, thin, and circular-shaped intermediate ring and with a proximal surface of the first flat, thin, and oval-shaped eccentric ring abutting against the outer surface of the wall of the utilization device and with a distal surface of a second flat, thin, and oval-shaped eccentric ring of the electrical cable to utilization device quick connector abutting against the inner surface of the utilization device; rotating a connector securing screw of the electrical cable to utilization device quick connector; and, causing the connector securing screw to thread along an internally-threaded sleeve of the electrical cable to utilization device quick connector and abut against the outer surface of the wall of the utilization device so as to maintain the wall of the utilization device in the back cut and between the first flat, thin, and oval-shaped eccentric ring and the second flat, thin, and oval-shaped eccentric ring and between the connector securing screw and the first flat, thin, and oval-shaped eccentric ring, so that the electrical cable is quickly and securely connected to the utilization device from the exterior of the utilization box without having to access the interior of the utilization box to turn a lock nut.

YET STILL ANOTHER OBJECT of the present invention is to provide a method of using an electrical cable to utilization device quick connector wherein the back cut is defined by an opposing uppermost minor arc side of the first flat, thin, and oval-shaped eccentric ring, a stop formed by an upper portion of the second flat, thin, and oval-shaped eccentric ring, and an upper portion of the flat, thin, and circular-shaped intermediate ring.

FINALLY, YET STILL ANOTHER OBJECT of the present invention is to provide a method of using an electrical cable to utilization device quick connector wherein the internally-threaded sleeve is disposed on an outer surface of a hollow body of the electrical cable to utilization device quick connector, diagonally to a longitudinal axis of the hollow body, and extending diagonally downwardly from short of an open proximal end of the hollow body to short of a distal end of the hollow body, and in a direction towards the lower portion of the flat, thin, and circular-shaped intermediate ring.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is an exploded diagrammatic perspective view of a preferred embodiment of the present invention for use with armor jacketed cable and being straight and interfacing with a standard armor jacketed electrical cable and a standard junction box;

FIG. 2 is an enlarged diagrammatic perspective view of the preferred embodiment of the present invention taken generally in the direction of arrow 2 in FIG. 1;

FIG. 3 is an enlarged diagrammatic side elevational view of the preferred embodiment of the present invention taken generally in the direction of arrow 3 in FIG. 1 and with an armor jacketed electrical cable secured therein;

FIG. 4 is an enlarged cross sectional view of the preferred embodiment of the present invention taken along line 4—4 in FIG. 1 and with an armor jacketed electrical cable being secured therein;

LIST OF REFERENCE NUMERALS UTILIZED IN THE DRAWING

Figure 5:
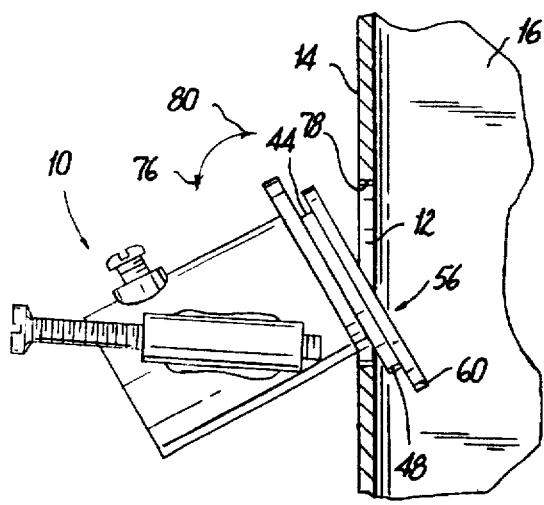
FIG. 5 is an enlarged side elevational view taken generally in the direction of arrow 3 in FIG. 1 illustrating the initial step for attaching the preferred embodiment of the present invention to the junction box.

Preferred Embodiment 10 electrical cable to utilization device quick connector of the present invention
11 junction box wall outer surface
12 junction box wall throughbore
13 junction box wall inner surface
14 junction box wall
16 junction box
18 standard armor jacketed electrical cable
20 hollow and cylindrically-shaped body
22 body open proximal end
24 body distal end
26 body longitudinal axis
28 body cylindrically-shaped outer longitudinal surface
29 body radially-oriented and threaded throughbore
30 body cylindrically-shaped internal longitudinal through-chamber
32 internally-threaded and cylindrically-shaped collar
34 electrical cable securing screw
36 first flat, thin, and oval-shaped eccentric ring
38 first eccentric ring pair of opposing major arc sides
39 first eccentric ring proximal surface
40 first eccentric ring pair of opposing minor arc sides
41 first eccentric ring distal surface
42 first eccentric ring circular-shaped throughbore
43 first eccentric ring upper portion stop
44 flat, thin, and circular-shaped intermediate ring
46 intermediate ring upper portion 48 intermediate ring lower portion
50 intermediate ring proximal surface
52 intermediate ring distal surface
54 intermediate ring circular-shaped and centrally-disposed throughbore
56 second flat, thin, and oval-shaped eccentric ring
58 second eccentric ring pair of opposing major arc sides
59 second eccentric ring proximal surface
60 second eccentric ring pair of opposing minor arc sides
61 second eccentric ring distal surface
62 second eccentric ring circular-shaped throughbore
64 back cut
66 internally-threaded sleeve
68 connector securing screw
70 removably-mounted and circular-ring-shaped electrical cable stop
72 electrical cable stop circular-shaped and centrally-disposed throughbore
74 plurality of equally-spaced apart and circumferentially-radially-disposed breakable tabs
76 upwardly tilt arrow
78 junction box wall throughbore perimeter
80 downwardly tilt arrow
82 traverse arrow First Alternate Embodiment 110 electrical cable to utilization device quick connector of the present invention
118 plastic jacketed cable
120 two part hollow and cylindrically-shaped body
122 body substantially U-shape in profile main portion
124 body main portion open top
126 body main portion top parallel, spaced-apart, and straight edges
128 body main portion pair of laterally-oriented, spaced-apart, and coplanar tabs
130 body main portion tab threaded throughbore
136 first flat, thin, and oval-shaped eccentric ring
144 flat, thin, and circular-shaped intermediate ring
156 second flat, thin, and oval-shaped eccentric ring
166 internally-threaded sleeve
168 body elongated and convexo-concave-shaped cover portion
169 body cover portion parallel, spaced-apart, and straight edges
170 body cover portion pair of laterally-oriented, spaced-apart, and coplanar tabs
172 body cover portion tab threaded throughbore
174 body cover pair of retaining screws Second Alternate Embodiment 210 electrical cable to utilization device quick connector of the present invention
220 hollow and L-shaped body
222 body long leg
224 body open proximal end
226 body short leg
228 body distal end
232 internally-threaded and cylindrically-shaped collar
236 first flat, thin, and oval-shaped eccentric ring
244 flat, thin, and circular-shaped intermediate ring
256 second flat, thin, and oval-shaped eccentric ring
266 internally-threaded sleeve Third Alternate Embodiment 310 electrical cable to utilization device quick connector of the present invention 322 body L-shaped main portion
324 body main portion substantially U-shape in profile long leg
325 body main portion long leg open top
326 body main portion long leg open proximal end
328 body main portion short leg
330 body main portion short leg distal end
336 first flat, thin, and oval-shaped eccentric ring
344 flat, thin, and circular-shaped intermediate ring
356 second flat, thin, and oval-shaped eccentric ring
366 internally-threaded sleeve

DETAILED DESCRIPTION OF THE PREFERRED EMBODIMENT

Referring now to the figures in which like numerals indicate like parts, and particularly to FIG. 1, which is an exploded diagrammatic perspective view of a preferred embodiment of the present invention for use with armor jacketed cable and being straight and interfacing with a standard armor jacketed electrical cable and a standard junction box, the electrical cable to utilization device quick connector of the present invention is shown generally at 10 interfacing with a junction box wall throughbore 12 in a junction box wall 14 of a junction box 16 that has a junction box wall outer surface 11 and a junction box wall inner surface 13 and further interfacing with a standard armor jacketed electrical cable 18 that has a diameter.

The configuration of the electrical cable to utilization device quick connector 10 and its interface with the standard armor jacketed electrical cable 18 can best be seen in FIGS. 2–4, which are an enlarged diagrammatic perspective view of the preferred embodiment of the present invention taken generally in the direction of arrow 2 in FIG. 1, an enlarged diagrammatic side elevational view of the preferred embodiment of the present invention taken generally in the direction of arrow 3 in FIG. 1 and with an armor jacketed electrical cable secured therein, and an enlarged cross sectional view of the preferred embodiment of the present invention taken along line 4—4 in FIG. 1 and with an armor jacketed electrical cable being secured therein, respectively, and as such will be discussed with reference thereto.

The electrical cable to utilization device quick connector 10 includes a hollow and cylindrically-shaped body 20.

The hollow and cylindrically-shaped body 20 has a body open proximal end 22, a body distal end 24 that is parallel to, and spaced from, the body open proximal end 22 of the hollow and cylindrically-shaped body 20, a body longitudinal axis 26, and a body cylindrically-shaped outer longitudinal surface 28.

The hollow and cylindrically-shaped body 20 further has a body radially-oriented and threaded throughbore 29 that has a perimeter and extends radially therethrough, perpendicularly to the body longitudinal axis 26 of the hollow and cylindrically-shaped body 20, and in close proximity to the body open proximal end 22 of the hollow and cylindrically-shaped body 20.

The hollow and cylindrically-shaped body 20 contains a body cylindrically-shaped internal longitudinal throughchamber 30 that extends along the body longitudinal axis 26 of the hollow and cylindrically-shaped body 20, opens into both the body open proximal end 22 of the hollow and cylindrically-shaped body 20 and the body distal end 24 of the hollow and cylindrically-shaped body 20, and has a diameter.

The electrical cable junction box quick connector 10 further includes an internally-threaded and cylindrically-shaped collar 32 that extends coaxially, and slightly outwardly, from the perimeter of the body radially-oriented and threaded throughbore 29 in the hollow and cylindrically-shaped body 20, and threadably communicates with the body radially-oriented and threaded throughbore 29 in the hollow and cylindrically-shaped body 20.

The electrical cable to utilization device quick connector 10 further includes an electrical cable securing screw 34 that threadably engages both the internally-threaded and cylindrically-shaped collar 32 and the body radially-oriented and threaded throughbore 29 in the hollow and cylindrically-shaped body 20, and is snugly abutable against the standard armor jacketed electrical cable 18 so as to selectively maintain the standard armor jacketed electrical cable 18 in the electrical cable junction box quick connector 10.

The electrical cable to utilization device quick connector 10 further includes a first flat, thin, and oval-shaped eccentric ring 36 that is integral with the hollow and cylindrically-shaped body 20.

The first flat, thin, and oval-shaped eccentric ring 36 has a first eccentric ring pair of opposing major arc sides 38, a first eccentric ring proximal surface 39, a first eccentric ring pair of opposing minor arc sides 40, and a first eccentric ring distal surface 41 that is parallel to, and spaced from, the first eccentric ring proximal surface 39 of the first flat, thin, and oval-shaped eccentric ring 36.

The first flat, thin, and oval-shaped eccentric ring 36 contains a first eccentric ring circular-shaped throughbore 42 that has a diameter less than the diameter of the body cylindrically-shaped internal longitudinal throughchamber 30 in the hollow and cylindrically-shaped body 20.

The first eccentric ring proximal surface 39 of the first flat, thin, and oval-shaped eccentric ring 36 is integral with the body distal end 24 of the hollow and cylindrically-shaped body 20.

A lowermost minor arc side of the first eccentric ring pair of minor arc sides 40 of the first flat, thin, and oval-shaped eccentric ring 36 is flush with the body cylindrically-shaped outer longitudinal surface 28 of the hollow and cylindrically-shaped body 20, at a position diametrically opposite to that of the internally-threaded and cylindrically-shaped collar 32.

An opposing uppermost minor arc side of the first eccentric ring pair of minor arc sides 40 of the first flat, thin, and oval-shaped eccentric ring 36 extends perpendicularly upwardly past the body cylindrically-shaped outer longitudinal surface 28 of the hollow and cylindrically-shaped body 20, in a direction in which the internally-threaded and cylindrically-shaped collar 32 extends, and forms a first eccentric ring upper portion stop 43.

The first eccentric ring pair of opposing major arc sides 38 of the flat, thin, and oval-shaped eccentric ring 36 extend perpendicularly outwardly past the body cylindrically-shaped outer longitudinal surface 28 of the hollow and cylindrically-shaped body 20, intermediate the first eccentric ring pair of minor arc sides 40 of the first flat, thin, and oval-shaped eccentric ring 36.

The first eccentric ring circular-shaped throughbore 42 in the flat, thin, and oval-shaped eccentric ring 36 is coaxial and communicates with the body cylindrically-shaped internal longitudinal throughchamber 30 in the hollow and cylindrically-shaped body 20.

The electrical cable to utilization device quick connector 10 further includes a flat, thin, and circular-shaped intermediate ring 44 that is integral with the first flat, thin, and oval-shaped eccentric ring 36.

The flat, thin, and circular-shaped intermediate ring 44 has an intermediate ring upper portion 46, an intermediate ring lower portion 48, an intermediate ring proximal surface 50, and an intermediate ring distal surface 52 that is parallel to, and spaced from, the intermediate ring proximal surface 50 of the flat, thin, and circular-shaped intermediate ring 44.

The flat, thin, and. circular-shaped intermediate ring 44 contains an intermediate ring circular-shaped and centrally-disposed throughbore 54 that has a diameter equal to the diameter of the first eccentric ring circular-shaped throughbore 42 in the first flat, thin, and oval-shaped eccentric ring 36.

The intermediate ring proximal surface 50 of the flat, thin, and circular-shaped intermediate ring 44 is integral with the first eccentric ring distal surface 41 of the first flat, thin, and oval-shaped eccentric ring 36.

The intermediate ring upper portion 46 of the flat, thin, and circular-shaped intermediate ring 44 is below the first eccentric ring upper portion stop 43 of the first flat, thin, and oval-shaped eccentric ring 36.

The intermediate ring lower portion 48 of the flat, thin, and circular-shaped intermediate ring 44 extends perpendicularly downwardly past the lowermost minor arc side of the first eccentric ring pair of minor arc sides 40 of the first flat, thin, and oval-shaped eccentric ring 36, in a direction opposite in which the internally-threaded and cylindrically-shaped collar 32 extends.

The intermediate ring circular-shaped and centrally-disposed throughbore 54 in the flat, thin, and circular-shaped intermediate ring 44 is coaxial and communicates with the first eccentric ring circular-shaped throughbore 42 in the first flat, thin, and oval-shaped eccentric ring 36.

The electrical cable to utilization device quick connector 10 further includes a second flat, thin, and oval-shaped eccentric ring 56 that is integral with the flat, thin, and circular-shaped intermediate ring 44.

The second flat, thin, and oval-shaped eccentric ring 56 has a second eccentric ring pair of opposing major arc sides 58, a second eccentric ring proximal surface 59, a second eccentric ring pair of opposing minor arc sides 60, and a second eccentric ring distal surface 61 that is parallel to, and spaced from, the second eccentric ring proximal surface 59 of the second flat, thin, and oval-shaped eccentric ring 56.

The second flat, thin, and oval-shaped eccentric ring 56 contains a second eccentric ring circular-shaped throughbore 62 that has a diameter equal to the diameter of the intermediate ring circular-shaped and centrally-disposed throughbore 54 in the flat, thin, and circular-shaped intermediate ring 44.

The second eccentric ring proximal surface 59 of the second flat, thin, and oval-shaped eccentric ring 56 is integral with the intermediate ring distal surface 52 of the flat, thin, and circular-shaped intermediate ring 44.

A lowermost minor arc side of the second eccentric ring pair of minor arc sides 60 of the second flat, thin, and oval-shaped eccentric ring 56 extends perpendicularly downwardly past the intermediate ring lower portion 48 of the flat, thin, and circular-shaped intermediate ring 44, in the direction opposite in which the internally-threaded and cylindrically-shaped collar 32 extends.

An opposing uppermost minor arc side of the second eccentric ring pair of minor arc sides 60 of the second flat, thin, and oval-shaped eccentric ring 56 extends perpendicularly upwardly past the intermediate ring upper portion 46 of the flat, thin, and circular-shaped intermediate ring 44, in the direction in which the internally-threaded and cylindrically-shaped collar 32 extends.

The second eccentric ring pair of opposing major arc sides 58 of the second flat, thin, and oval-shaped eccentric ring 56 extend perpendicularly outwardly past the flat, thin, and circular-shaped intermediate ring 44.

The second eccentric ring circular-shaped throughbore 62 in the second flat, thin, and oval-shaped eccentric ring 56 is coaxial and communicates with the intermediate ring circular-shaped and centrally-disposed throughbore 54 of the flat, thin, and circular-shaped intermediate ring 44.

The first eccentric ring upper portion stop 43 of the first flat, thin, and oval-shaped eccentric ring 36 together with the intermediate ring upper portion 46 of the flat, thin, and circular-shaped intermediate ring 44 and the opposing uppermost minor arc side of the second eccentric ring pair of minor arc sides 60 of the second flat, thin, and oval-shaped eccentric ring 56 define a back cut 64.

The electrical cable junction box quick connector 10 further includes an internally-threaded sleeve 66.

The internally-threaded sleeve 66 is disposed on the body cylindrically-shaped outer longitudinal surface 28 of the hollow and cylindrically-shaped body 20, diagonally to the body longitudinal axis 26 of the hollow and cylindrically-shaped body 20, and extending diagonally downwardly from short of the body open proximal end 22 of the hollow and cylindrically-shaped body 20 to short of the body distal end 24 of the hollow and cylindrically-shaped body 20, in a direction towards the intermediate ring lower portion 48 of the flat, thin, and circular-shaped intermediate ring 44.

The electrical cable to utilization device quick connector 10 further includes a connector securing screw 68 that threadably engages the internally-threaded sleeve 66 and is snugly abutable against the junction box wall 14 of the junction box 16 so as to selectively maintain the electrical cable to utilization device quick connector 10 to the junction box 16.

The electrical cable to utilization device quick connector 10 further includes a removably-mounted and circular-ring-shaped electrical cable stop 70 that contains an electrical cable stop circular-shaped and centrally-disposed throughbore 72 with a diameter less than the diameter of the second eccentric ring circular-shaped throughbore 62 in the second flat, thin, and oval-shaped eccentric ring 56.

The removably-mounted and circular-ring-shaped electrical cable stop 70 is parallel to, and slightly spaced outward from, the second eccentric ring distal surface 61 of the second flat, thin, and oval-shaped eccentric ring 56, and is removably attached thereto, by a plurality of equally-spaced apart and circumferentially-radially-disposed breakable tabs 74, and provides a stop for the standard armor jacketed electrical cable 18 when the diameter of the standard armor jacketed electrical cable 18 is less than the diameter of the second eccentric ring circular-shaped throughbore 62 in the second flat, thin, and oval-shaped eccentric ring 56 so as to allow the electrical cable to utilization device quick connector to be usable with different sized standard armor jacketed electrical cables.

Figure 6:
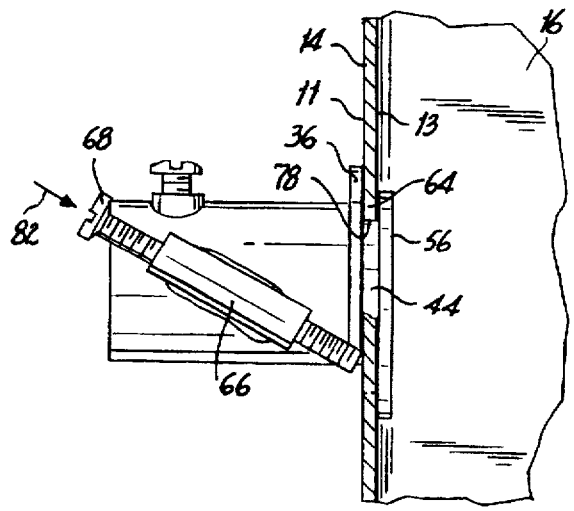
FIG. 6 is an enlarged side elevational view taken generally in the direction of arrow 3 in FIG. 1 illustrating the intermediate and final steps for attaching the preferred embodiment of the present invention to the junction box.

The method of installing the electrical cable to utilization device quick connector 10 to the junction box 16 can best be seen in FIGS. 4, 5 and 6, which are an enlarged cross sectional view of the preferred embodiment of the present invention taken along line 4—4 in FIG. 1 and with an armor jacketed electrical cable being secured therein, an enlarged side elevational view taken generally in the direction of arrow 3 in FIG. 1 illustrating the initial step for attaching the preferred embodiment of the present invention to the junction box, and an enlarged side elevational view taken generally in the direction of arrow 3 in FIG. 1 illustrating the intermediate and final steps for attaching the preferred embodiment of the present invention to the junction box, respectively, and as such will be discussed with reference thereto.

STEP 1: As shown in FIG. 4, thread the electrical cable 18 into the electrical cable to utilization device quick connector 10.

STEP 2: Securing the electrical cable 18 into the electrical cable to utilization device quick connector 10, by use of the electrical cable securing screw 34.

STEP 3: As shown in FIG. 5, tilt the electrical cable to utilization device quick connector 10 upwardly, in the direction of upwardly tilt arrow 76.

STEP 4: Pass the lowermost minor arc side of the second eccentric ring pair of minor arc sides 60 of the second flat, thin, and oval-shaped eccentric ring 56 and the intermediate ring lower portion 48 of the flat, thin, and circular-shaped intermediate ring 44 through the junction box wall throughbore 12 in the junction box wall 14 of the junction box 16 that is defined by a junction box wall throughbore perimeter 78.

STEP 5: Tilt the electrical cable to utilization device quick connector 10 downwardly, in the direction of downwardly tilt arrow 80.

STEP 6: As shown in FIG. 6, seat the junction box wall throughbore perimeter 78 of the junction box wall throughbore 12 in the junction box wall 14 of the junction box 16 in the back cut 64, and against the flat, thin, and circular-shaped intermediate ring 44, with the first eccentric ring distal surface 41 of the first flat, thin, and oval-shaped eccentric ring 36 abutting against the junction box wall outer surface 11 of the junction box wall 14 of the junction box 16, and with the second eccentric ring proximal surface 59 of the second flat, thin, and oval-shaped eccentric ring 56 abutting against the junction box wall inner surface 13 of the junction box wall 14 of the junction box 16.

STEP 7: Rotate the connector securing screw 68 from the exterior of the junction box 16 and cause the connector securing screw 68 to thread along the internally-threaded sleeve 66, in the direction of traverse arrow 82, and abut against the junction box wall outer surface 11 of the junction box wall 14 of the junction box 16 so as to maintain the junction box wall 14 of the junction box 16 in the back cut 64, between the first flat, thin, and oval-shaped eccentric ring 36 and the second flat, thin, and oval-shaped eccentric ring 56, and between the connector securing screw 68 and the second flat, thin, and oval-shaped eccentric ring 56, so that the electrical cable junction box quick connector 10 is secured to the junction box 16 from the exterior of the junction box 16 without having to access the interior of the junction box 16 to turn a lock nut.

It is apparent that the configurations and positions of the first flat, thin, and oval-shaped eccentric ring 36, the flat, thin, and circular-shaped intermediate ring 44, the second flat, thin, and oval-shaped eccentric ring 56, and the internally-threaded sleeve 66 are significant and of critical importance.

Figure 7:
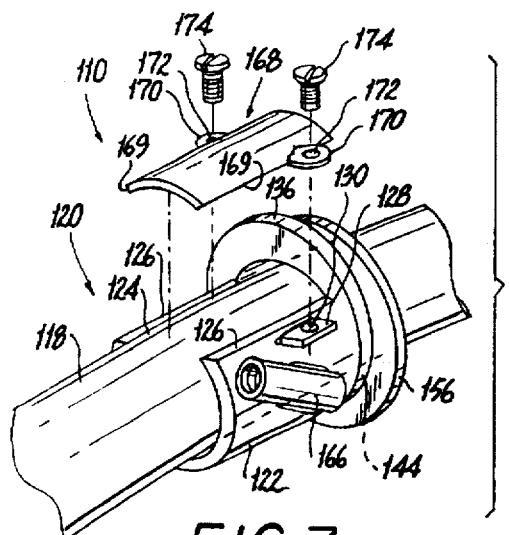
FIG. 7 is an exploded diagrammatic perspective view of a first alternate embodiment of the present invention for use with plastic jacketed cable and being straight.

The configuration of the first alternate embodiment of an electrical cable to utilization device quick connector 110 and its interface with a plastic jacketed cable 118 can best be seen in FIG. 7, which is an exploded diagrammatic perspective view of a first alternate embodiment of the present invention for use with plastic jacketed cable and being straight, and as such will be discussed with reference thereto.

The electrical cable to utilization device quick connector 110 is identical to the electrical cable to utilization device quick connector 10, except that the hollow and cylindrically-shaped body 20 is replaced by a two part hollow and cylindrically-shaped body 120, and the body radially-oriented and threaded throughbore 29 in the hollow and cylindrically-shaped body 20, the electrical cable securing screw 34, and the internally-threaded and cylindrically-shaped collar 32 are nonexistent.

The two part hollow and cylindrically-shaped body 120 includes a body substantially U-shape in profile main portion 122 that has an internally-threaded sleeve 166 disposed thereon as is the internally-threaded sleeve 66 in the electrical cable to utilization device quick connector 10, a first flat, thin, and oval-shaped eccentric ring 136 disposed thereon as is the first flat, thin, and oval-shaped eccentric ring 36 in the electrical cable to utilization device quick connector 10, a flat, thin, and circular-shaped intermediate ring 144 disposed thereon as is the flat, thin, and circular-shaped intermediate ring 44 in the electrical cable to utilization device quick connector 10, and a second flat, thin, and oval-shaped eccentric ring 156 disposed thereon as is the second flat, thin, and oval-shaped eccentric ring 56 in the electrical cable to utilization device quick connector 10.

The body substantially U-shape in profile main portion 122 of the two part hollow and cylindrically-shaped body 120 has a body main portion open top 124 that is defined by a body main portion top parallel, spaced-apart, and straight edges 126.

The body substantially U-shape in profile main portion 122 of the two part hollow and cylindrically-shaped body 120 further has a body main portion pair of laterally-oriented, spaced-apart, and coplanar tabs 128, each of which has a body main portion tab threaded throughbore 130 and extends laterally outwardly from a respective edge of the body main portion top parallel, spaced-apart, and straight edges 126 of the body main portion open top 124 of the body substantially U-shape in profile main portion 122 of the two part hollow and cylindrically-shaped body 120, in proximity to the first flat, thin, and oval-shaped eccentric ring 136.

The two part hollow and cylindrically-shaped body 120 further includes a body elongated and convexo-concave-shaped cover portion 168 that selectively opens and closes the body main portion open top 124 of the body substantially U-shape in profile main portion 122 of the two part hollow and cylindrically-shaped body 120.

The body elongated and convexo-concave-shaped cover portion 168 of the two part hollow and cylindrically-shaped body 120 has body cover portion parallel, spaced-apart, and straight edges 169 and a body cover portion pair of laterally-oriented, spaced-apart, and coplanar tabs 170.

Each tab of the body cover portion pair of laterally-oriented, spaced-apart, and coplanar tabs 170 of the body elongated and convexo-concave-shaped cover portion 168 of the two part hollow and cylindrically-shaped body 120 has a body cover portion tab threaded throughbore 172.

Each tab of the body cover portion pair of laterally-oriented, spaced-apart, and coplanar tabs 170 of the body elongated and convexo-concave-shaped cover portion 168 of the two part hollow and cylindrically-shaped body 120 extends laterally outwardly from a respective edge of the body cover portion parallel, spaced-apart, and straight edges 169 of the body elongated and convexo-concave-shaped cover portion 168 of the two part hollow and cylindrically-shaped body 120, in proximity to the first flat, thin, and oval-shaped eccentric ring 136, and with the body cover portion tab threaded throughbore 172 in each tab of the body cover portion pair of laterally-oriented, spaced-apart, and coplanar tabs 170 of the body elongated and convexo-concave-shaped cover portion 168 of the two part hollow and cylindrically-shaped body 120 being alignable with the body main portion tab threaded throughbore in a respective tab 130 of the body main portion pair of laterally-oriented, spaced-apart, and coplanar tabs 128 of the body substantially U-shape in profile main portion 122 of the two part hollow and cylindrically-shaped body 120.

The electrical cable to utilization device quick connector 110 further includes a body cover pair of retaining screws 174.

Each screw of the body cover pair of retaining screws 174 threadably engages the body cover portion tab threaded throughbore 172 in a tab of the body cover portion pair of laterally-oriented, spaced-apart, and coplanar tabs 170 of the body elongated and convexo-concave-shaped cover portion 168 of the two part hollow and cylindrically-shaped body 120 and the body main portion tab threaded throughbore in a respective tab 130 of the body main portion pair of laterally-oriented, spaced-apart, and coplanar tabs 128 of the body substantially U-shape in profile main portion 122 of the two part hollow and cylindrically-shaped body 120 so as to selectively maintain the body elongated and convexo-concave-shaped cover portion 168 of the two part hollow and cylindrically-shaped body 120 to the body substantially U-shape in profile main portion 122 of the two part hollow and cylindrically-shaped body 120.

Figure 8:
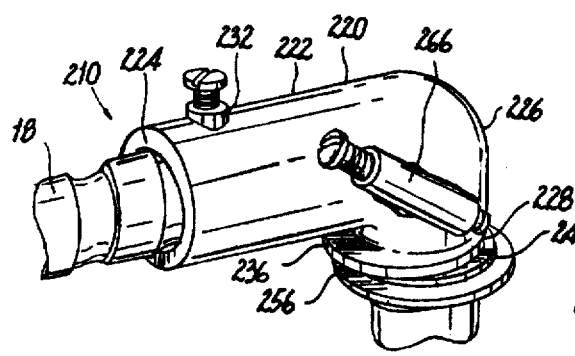
FIG. 8 is a diagrammatic perspective view of a second alternate embodiment of the present invention for use with armor jacketed cable and being angled.

The configuration of the second alternate embodiment of an electrical cable to utilization device quick connector 210 can best be seen in FIG. 8, which is a diagrammatic perspective view of a second alternate embodiment of the present invention for use with armor jacketed cable and being angled, and as such will be discussed with reference thereto.

The electrical cable to utilization device quick connector 210 is identical to the electrical cable to utilization device quick connector 10, except that the hollow and cylindrically-shaped body 20 is replaced by a hollow and L-shaped body 220 that has a body long leg 222 with a body open proximal end 224 thereat that replaces the body open proximal end 22 and a body short leg 226 with a body distal end 228 thereat that replaces the body distal end 24.

The hollow and L-shaped body 220 has an internally-threaded sleeve 266 disposed thereon as is the internally-threaded sleeve 66 in the electrical cable to utilization device quick connector 10, a first flat, thin, and oval-shaped eccentric ring 236 disposed on the body distal end 228 thereof as is the first flat, thin, and oval-shaped eccentric ring 36 in the electrical cable to utilization device quick connector 10, a flat, thin, and circular-shaped intermediate ring 244 disposed thereon as is the flat, thin, and circular-shaped intermediate ring 44 in the electrical cable to utilization device quick connector 10, a second flat, thin, and oval-shaped eccentric ring 256 disposed thereon as is the second flat, thin, and oval-shaped eccentric ring 56 in the electrical cable to utilization device quick connector 10, and an internally-threaded and cylindrically-shaped collar 232 disposed thereon as is the internally-threaded and cylindrically-shaped collar 32 in the electrical cable to utilization device quick connector 10.

Figure 9:
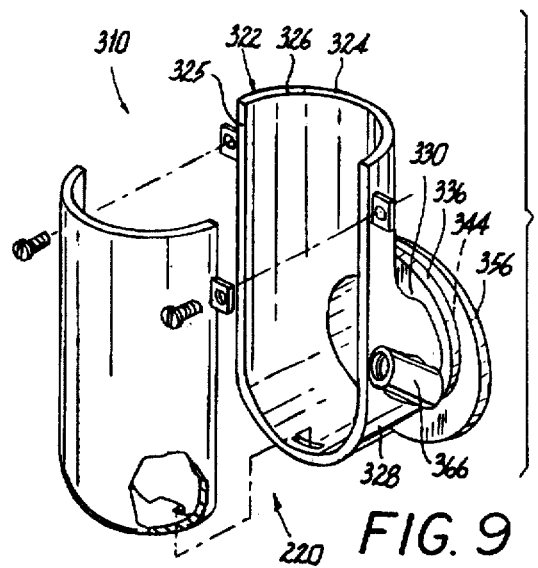
FIG. 9 is an exploded diagrammatic perspective view of a third alternate embodiment of the present invention for use with plastic jacketed cable and being angled.

The configuration of the third alternate embodiment of an electrical cable to utilization device quick connector 310 can best be seen in FIG. 9, which is an exploded diagrammatic perspective view of a third alternate embodiment of the present invention for use with plastic jacketed cable and being angled, and as such will be discussed with reference thereto.

The electrical cable to utilization device quick connector 310 is identical to the electrical cable to utilization device quick connector 110, except that the body substantially U-shape in profile main portion 122 of the two part hollow and cylindrically-shaped body 120 is replaced by a body L-shaped main portion 322 that has a body main portion substantially U-shape in profile long leg 324 with a body main portion long leg open proximal end 326 thereat and a body main portion short leg 328 with a body main portion short leg distal end 330 thereat.

The body L-shaped main portion 322 has an internally-threaded sleeve 366 disposed thereon as is the internally-threaded sleeve 166 in the electrical cable to utilization device quick connector 110, a first flat, thin, and oval-shaped eccentric ring 336 disposed thereon as is the first flat, thin, and oval-shaped eccentric ring 136 in the electrical cable to utilization device quick connector 110, a flat, thin, and circular-shaped intermediate ring 344 disposed thereon as is the flat, thin, and circular-shaped intermediate ring 144 in the electrical cable to utilization device quick connector 110, and a second flat, thin, and oval-shaped eccentric ring 356 disposed thereon as is the second flat, thin, and oval-shaped eccentric ring 156 in the electrical cable to utilization device quick connector 110.

The body main portion substantially U-shape in profile long leg 324 of the body L-shaped main portion 322 has a body main portion long leg open top 325 thereon as is the body main portion open top 124 of the electrical cable utilization device quick connector 110.

It will be understood that each of the elements described above, or two or more together, may also find a useful application in other types of constructions differing from the types described above.

While the invention has been illustrated and described as embodied in an electrical cable to utilization device quick connector, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An electrical cable to utilization device quick connector that quickly and securely connects an electrical cable with a diameter to a utilization device that has an interior, an exterior, and a wall with an exterior surface, an interior surface, and a throughbore extending therethrough, wherein said electrical cable to utilization device quick connector quickly and securely connects the electrical cable to the utilization device from the exterior of the utilization device without having to access the interior of the utilization device to turn a locking nut, said electrical cable to utilization device quick connector comprising:

a) a hollow body having an open proximal end, a distal end spaced from said open proximal end of said hollow body, a longitudinal axis, and an outer surface, and containing an internal throughchamber having a diameter and opening into both said open proximal end of said hollow body and said distal end of said hollow body;

b) electrical cable securing means associated with said hollow body for selectively maintaining the electrical cable in said hollow body, so that the electrical cable is selectively maintained in said electrical cable to utilization device quick connector;

c) a first flat, thin, and oval-shaped eccentric ring having:
   i) a proximal surface integrally formed with said distal end of said hollow body;
   ii) a pair of opposing minor arc sides with a lowermost minor arc side thereof being flush with said outer surface of said hollow body and with an opposing uppermost minor arc side thereof extending perpendicularly to said longitudinal axis upwardly past said outer surface of said hollow body, in a direction which is similar to a direction in which said electrical cable securing means extends, and forming a stop;
   iii) a pair of opposing major arc sides extending perpendicularly to said longitudinal axis outwardly past said outer surface of said hollow body, intermediate said pair of minor arc sides of said first flat, thin, and oval-shaped eccentric ring;
   iv) a distal surface parallel to, and spaced from, said proximal surface of said first flat, thin, and oval-shaped eccentric ring; and
   v) a circular-shaped throughbore with a diameter;

d) a flat, thin, and circular-shaped intermediate ring having:
   i) a proximal surface integrally formed with said distal surface of said first flat, thin, and oval-shaped eccentric ring;
   ii) an upper portion disposed below said stop of said first flat, thin, and oval-shaped eccentric ring;
   iii) a lower portion extending perpendicularly to said longitudinal axis downwardly past said lowermost minor arc side of said pair of minor arc sides of said first flat, thin, and oval-shaped eccentric ring, in a direction which is opposite to the direction in which said electrical cable securing means extends;
   iv) a distal surface parallel to, and spaced from, said proximal surface of said flat, thin, and circular-shaped intermediate ring; and
   v) a circular-shaped and centrally-disposed throughbore with a diameter;

e) a second flat, thin, and oval-shaped eccentric ring having:
   i) a proximal surface integrally formed with said distal surface of said flat, thin, and circular-shaped intermediate ring;
   ii) a pair of opposing minor arc sides with a lowermost minor arc side thereof extending perpendicularly to said longitudinal axis downwardly past said lower portion of said flat, thin, and circular-shaped intermediate ring, in a direction which is opposite to the direction in which said electrical cable securing means extends, and with an opposing uppermost minor arc side thereof extending perpendicularly to said longitudinal axis upwardly past said upper portion of said flat, thin, and circular-shaped intermediate ring, in a direction which is similar to the direction in which said electrical cable securing means extends, and together with said stop of said first flat, thin, and oval-shaped eccentric ring and said upper portion of said flat, thin, and circular-shaped intermediate ring defining a back cut;

iii) a pair of opposing major arc sides extending perpendicularly to said longitudinal axis outwardly past said flat, thin, and circular-shaped intermediate ring;

iv) a distal surface parallel to, and spaced from, said proximal surface of said second flat, thin, and oval-shaped eccentric ring; and v) a circular-shaped throughbore with a diameter;

f) an internally-threaded sleeve disposed on said outer surface of said hollow body, diagonally to said longitudinal axis of said hollow body, and extending diagonally downwardly from short of said open proximal end of said hollow body to short of said distal end of said hollow body, towards said lower portion of said flat, thin, and circular-shaped intermediate ring; and g) a connector securing screw threadably engaging said internally-threaded sleeve and being snugly abutable against the exterior surface of the wall of the utilization device so as to selectively maintain said electrical cable to utilization device quick connector to the utilization device, so that when said electrical cable to utilization device quick connector is tilted upwardly and said lowermost minor arc side of said pair of minor arc sides of said second flat, thin, and oval-shaped eccentric ring and said lower portion of said flat, thin, and circular-shaped intermediate ring are passed through the throughbore in the wall of the utilization device that is defined by a perimeter, and then when said electrical cable to utilization device quick connector is tilted downwardly and the perimeter of the throughbore in the wall of the utilization device is seated in said back cut and against said flat, thin, and circular-shaped intermediate ring, and said distal surface of said first flat, thin, and oval-shaped eccentric ring abuts against the exterior surface of the wall of the utilization device and said proximal surface of said second flat, thin, and oval-shaped eccentric ring abuts against the interior surface of the wall of the utilization device, and then when said connector securing screw is rotated from the exterior of the utilization device and caused to thread along said internally-threaded sleeve and abut against the exterior surface of the wall of the utilization device so as to maintain the wall of the utilization device in said back cut and between said first flat, thin, and oval-shaped eccentric ring and said second flat, thin, and oval-shaped eccentric ring and between said connector securing screw and said second flat, thin, and oval-shaped eccentric ring, said electrical cable to utilization device quick connector with the electrical cable maintained therein is quickly and securely connected to the utilization device from the exterior of the utilization device without having to access the interior of the utilization device to turn a lock nut.

2. The connector as defined in claim 1, wherein said hollow body is one of a hollow and cylindrically-shaped body and a hollow and L-shaped body that has a long leg with said open proximal end thereat and said longitudinal axis therealong and a short leg with said distal end thereat.

3. The connector as defined in claim 1, wherein said diameter of said circular-shaped throughbore in said first flat, thin, and oval-shaped eccentric ring is less than said diameter of said internal throughchamber in said hollow body.

4. The connector as defined in claim 1, wherein said circular-shaped throughbore in said first flat, thin, and oval-shaped eccentric ring is coaxial and communicates with said internal throughchamber in said hollow body.

5. The connector as defined in claim 1, wherein said diameter of said circular-shaped and centrally-disposed throughbore in said flat, thin, and circular-shaped intermediate ring is equal to said diameter of said circular-shaped throughbore in said first flat, thin, and oval-shaped eccentric ring.

6. The connector as defined in claim 1, wherein said circular-shaped and centrally-disposed throughbore in said flat, thin, and circular-shaped intermediate ring is coaxial and communicates with said circular-shaped throughbore in said first flat, thin, and oval-shaped eccentric ring.

7. The connector as defined in claim 1, wherein said diameter of said circular-shaped throughbore in said second flat, thin, and oval-shaped eccentric ring is equal to said diameter of said circular-shaped and centrally-disposed throughbore in said flat, thin, and circular-shaped intermediate ring.

8. The connector as defined in claim 1, wherein said circular-shaped throughbore in said second flat, thin, and oval-shaped eccentric ring is coaxial and communicates with said circular-shaped and centrally-disposed throughbore in said flat, thin, and circular-shaped intermediate ring.

9. The connector as defined in claim 1; further comprising a removably-mounted and circular-ring-shaped electrical cable stop having a circular-shaped and centrally-disposed throughbore with a diameter less than said diameter of said circular-shaped throughbore in said second flat, thin, and oval-shaped eccentric ring, and providing a stop for the electrical cable when the diameter of the electrical cable is less than said diameter of said circular-shaped throughbore in said second flat, thin, and oval-shaped eccentric ring so as to allow said electrical cable to utilization device quick connector to be used with different sized electrical cables.

10. The connector as defined in claim 9, wherein said removably-mounted and circular-ring-shaped electrical cable stop is parallel to, and spaced slightly outward from, said distal surface of said second flat, thin, and oval-shaped eccentric ring, and is removably attached thereto, by a plurality of equally-spaced apart and circumferentially-radially-disposed breakable tabs.

11. The connector as defined in claim 2, wherein said electrical cable securing means includes said hollow body having a radially-oriented and threaded throughbore with a perimeter that extends radially therethrough, perpendicularly to said longitudinal axis of said hollow body, and in proximity to said open proximal end of said hollow body.

12. The connector as defined in claim 11, wherein said electrical cable securing means further includes an internally-threaded and cylindrically-shaped collar that extends coaxially, and slightly outwardly, from said perimeter of said radially oriented and threaded throughbore in said hollow body and threadably communicates with said radially-oriented and threaded throughbore in said hollow body.

13. The connector as defined in claim 12, wherein said electrical cable securing means further includes an electrical cable securing screw that threadably engages both said internally-threaded and cylindrically-shaped collar and said radially-oriented and threaded throughbore in said hollow body and is snugly abutable against the electrical cable so as to selectively maintain the electrical cable in said hollow body, so that said cable, which is a metal clad armored electrical cable, is selectively maintained in said electrical cable to utilization device quick connector.

14. The connector as defined in claim 10, wherein said hollow body is a two part hollow body.

15. The connector as defined in claim 14, wherein said two part hollow body includes a main portion that is one of cylindrically-shaped, and L-shaped; said main portion of said two part hollow body has at least a substantially U-shape in profile portion with an open top defined by a pair of parallel, spaced-apart, and straight edges.

16. The connector as defined in claim 15, wherein said electrical cable securing means includes a first pair of laterally-oriented, spaced-apart, and coplanar tabs, each of which extends laterally outwardly from a respective edge of said pair of parallel, spaced-apart, and straight edges of said open top of said substantially U-shape in profile portion of said main portion of said two part hollow body, and has a threaded throughbore extending therethrough.

17. The connector as defined in claim 16, wherein said two part hollow body further includes an elongated and convexo-concave-shaped cover portion that selectively opens and closes said open top of said substantially U-shape in profile portion of said main portion of said two part hollow body, and has a pair of parallel, spaced-apart, and straight edges.

18. The connector as defined in claim 17, wherein said electrical cable securing means further includes a second pair of laterally-oriented, spaced-apart, and coplanar tabs, each of which extends laterally outwardly from a respective edge of said pair of parallel, spaced-apart, and straight edges of said elongated and convexo-concave-shaped cover portion of said two part body and has a threaded throughbore extending therethrough that is in alignment with said threaded throughbore in a respective tab of said first pair of laterally-oriented, spaced-apart, and coplanar tabs of said electrical cable securing means on said substantially U-shape in profile portion of said main portion of said two part hollow body.

19. The connector as defined in claim 18, wherein said electrical cable securing means further includes a pair of retaining screws, each of which threadably engages said threaded throughbore in a tab of said second pair of laterally-oriented, spaced-apart, and coplanar tabs of said electrical cable securing means on said elongated and convexo-concave-shaped cover portion of said two part hollow body and threadably engages said threaded throughbore in a respective tab of said first pair of laterally-oriented, spaced-apart, and coplanar tabs of said electrical cable securing means on said substantially U-shape in profile portion of said main portion of said two part hollow body so as to selectively maintain said elongated and convexo-concave-shaped cover portion of said two part hollow body to said substantially U-shape in profile portion of said main portion of said two part hollow body, so that said cable, which is a non-armored electrical cable, is selectively maintained in said electrical cable to utilization device quick connector.

20. A method of using an electrical cable to utilization device quick connector to quickly and securely connect an electrical cable to a utilization device that has an exterior, an interior, and a wall with an exterior surface, an interior surface, and a throughbore extending therethrough that is defined by a perimeter, wherein the electrical cable is quickly and securely connected to the utilization device from the exterior of the utilization device without having to access the interior of the utilization device to turn a lock nut, comprising the steps of:

a) threading the electrical cable into said electrical cable to utilization device quick connector;

b) securing the electrical cable into said electrical cable to utilization device quick connector, by use of electrical cable securing means;

c) tilting said electrical cable to utilization device quick connector upwardly;

d) passing a lowermost minor arc side of a pair of minor arc sides of a first flat, thin, and oval-shaped eccentric ring of said electrical cable to utilization device quick connector and a lower portion of a flat, thin, and circular-shaped intermediate ring of said electrical cable to utilization device quick connector through the throughbore in the wall of the utilization device;

e) tilting said electrical cable to utilization device quick connector downwardly;

f) seating the perimeter of the throughbore in the wall of the utilization device in a back cut of said electrical cable to utilization device quick connector and against said flat, thin, and circular-shaped intermediate ring of said electrical cable to utilization device quick connector, and with a proximal surface of said first flat, thin, and oval-shaped eccentric ring abutting against the interior surface of the wall of the utilization device, and with a distal surface of a second flat, thin, and oval-shaped eccentric ring of said electrical cable to utilization device quick connector abutting against the exterior surface of one wall of the utilization device;

g) rotating a connector securing screw of said electrical cable to utilization device quick connector disposed externally to the utilization device; and h) causing said connector securing screw to thread along an internally-threaded sleeve of said electrical cable to utilization device quick connector and abut against the outer surface of the wall of the utilization device so as to maintain the wall of the utilization device in said back cut and between the first flat, thin, and oval-shaped eccentric ring and the second flat, thin, and oval-shaped eccentric ring and between said connector securing screw and the first flat, thin, and oval-shaped eccentric ring, so that the electrical cable is quickly and securely connected to the utilization device from the exterior of the utilization device without having to access the interior of the utilization device to turn a lock nut.

21. The method as defined in claim 20, wherein said back cut is defined by an opposing uppermost minor arc side of said first flat, thin, and oval-shaped eccentric ring, a stop formed by an upper portion of said second flat, thin, and oval-shaped eccentric ring, and an upper portion of said flat, thin, and circular-shaped intermediate ring.

22. The method as defined in claim 20, wherein said internally-threaded sleeve is disposed on an outer surface of a hollow body of said electrical cable to utilization device quick connector, diagonally to a longitudinal axis of said hollow body, and extending diagonally downwardly from short of an open proximal end of said hollow body to short of a distal end of said hollow body, towards said lower portion of said flat, thin, and circular-shaped intermediate ring.

23. A method of quickly and securely connecting an electrical cable to a utilization device that has an interior, an exterior, and a wall with an exterior surface, an interior surface, and a throughbore extending therethrough wherein the electrical cable is quickly and securely connected to the utilization device from the exterior of the utilization device without having to access the interior of the utilization device to turn a locking nut, comprising the step of connecting the electrical cable quickly and securely to the utilization device using an electrical cable to utilization device quick connector which comprises:

a) a hollow body having an open proximal end, a distal end spaced from said open proximal end of said hollow body, a longitudinal axis, and an outer surface, and containing an internal throughchamber having a diameter and opening into both said open proximal end of said hollow body and said distal end of said hollow body;

b) electrical cable securing means associated with said hollow body for selectively maintaining the electrical cable in said hollow body, so that the electrical cable is selectively maintained in said electrical cable to utilization device quick connector;

c) a first flat, thin, and oval-shaped eccentric ring having:
  i) a proximal surface integrally formed with said distal end of said hollow body;
  ii) a pair of opposing minor arc sides with a lowermost minor arc side thereof being flush with said outer surface of said hollow body, and with an opposing uppermost minor arc side thereof extending perpendicularly to said longitudinal axis upwardly past said outer surface of said hollow body, in a direction which is similar to a direction in which said electrical cable securing means extends, and forming a stop;
  iii) a pair of opposing major arc sides extending perpendicularly to said longitudinal axis outwardly past said outer surface of said hollow body, intermediate said pair of minor arc sides of said first flat, thin, and oval-shaped eccentric ring;
  iv) a distal surface parallel to, and spaced from, said proximal surface of said first flat, thin, and oval-shaped eccentric ring; and
  v) a circular-shaped throughbore with a diameter;

d) a flat, thin, and circular-shaped intermediate ring having:
  i) a proximal surface integrally formed with said distal surface of said first flat, thin, and oval-shaped eccentric ring;
  ii) an upper portion disposed below said stop of said first flat, thin, and oval-shaped eccentric ring;
  iii) a lower portion extending perpendicularly to said longitudinal axis downwardly past said lowermost minor arc side of said pair of minor arc sides of said first flat, thin, and oval-shaped eccentric ring, in a direction which is opposite to the direction in which said electrical cable securing means extends;
  iv) a distal surface parallel to, and spaced from, said proximal surface of said flat, thin, and circular-shaped intermediate ring; and
  v) a circular-shaped and centrally-disposed throughbore with a diameter;

e) a second flat, thin, and oval-shaped eccentric ring having:
  i) a proximal surface integrally formed with said distal surface of said flat, thin, and circular-shaped intermediate ring;
  ii) a pair of opposing minor arc sides with a lowermost minor arc side thereof extending perpendicularly to said longitudinal axis downwardly past said lower portion of said flat, thin, and circular-shaped intermediate ring, in a direction which is opposite to the direction in which said electrical cable securing means extends, and with an opposing uppermost minor arc side thereof extending perpendicularly to said longitudinal axis upwardly past said upper portion of said flat, thin, and circular-shaped intermediate ring, in a direction which is similar to the direction in which said electrical cable securing means extends, and together with said stop of said first flat, thin, and oval-shaped eccentric ring and said upper portion of said flat, thin, and circular-shaped intermediate ring defining a back cut;
  iii) a pair of opposing major arc sides extending perpendicularly to said longitudinal axis outwardly past said flat, thin, and circular-shaped intermediate ring;
  iv) a distal surface parallel to, and spaced from, said proximal surface of said second flat, thin, and oval-shaped eccentric ring; and
  v) a circular-shaped throughbore with a diameter;

f) an internally-threaded sleeve disposed on said outer surface of said hollow body, diagonally to said longitudinal axis of said hollow body, and extending diagonally downwardly from short of said open proximal end of said hollow body to short of said distal end of said hollow body, towards said lower portion of said flat, thin, and circular-shaped intermediate ring; and g) a connector securing screw threadably engaging said internally-threaded sleeve and being snugly abutable against the exterior surface of the wall of the utilization device so as to selectively maintain said electrical cable to utilization device quick connector to the utilization device, so that when said electrical cable to utilization device quick connector is tilted upwardly and said lowermost minor arc side of said pair of minor arc sides of said second flat, thin, and oval-shaped eccentric ring and said lower portion of said flat, thin, and circular-shaped intermediate ring are passed through the throughbore in the wall of the utilization device that is defined by a perimeter, and then when said electrical cable to utilization device quick connector is tilted downwardly and the perimeter of the throughbore in the wall of the utilization device is seated in said back cut and against said flat, thin, and circular-shaped intermediate ring and said distal surface of said first flat, thin, and oval-shaped eccentric ring abuts against the exterior surface of the wall of the utilization device and said proximal surface of said second flat, thin, and oval-shaped eccentric ring abuts against the interior surface of the wall of the utilization device, and then when said connector securing screw is rotated from the exterior of the utilization device and caused to thread along said internally-threaded sleeve and abut against the exterior surface of the wall of the utilization device so as to maintain the wall of the utilization device in said back cut and between said first flat, thin, and oval-shaped eccentric ring and said second flat, thin, and oval-shaped eccentric ring and between said connector securing screw and said second flat, thin, and oval-shaped eccentric ring, said electrical cable to utilization device quick connector with the electrical cable maintained therein is quickly and securely connected to the utilization device from the exterior of the utilization device without having to access the interior of the utilization device to turn a lock nut.

* * * * *